(12) United States Patent
Smyrl

(10) Patent No.: US 8,773,433 B1
(45) Date of Patent: Jul. 8, 2014

(54) COMPONENT-BASED LIGHTING

(75) Inventor: Eliot Smyrl, Piedmont, CA (US)

(73) Assignee: Pixar, Emeryville, CA (US)

( * ) Notice: Subject to any disclaimer, the term of this patent is extended or adjusted under 35 U.S.C. 154(b) by 1350 days.

(21) Appl. No.: 11/734,777

(22) Filed: Apr. 12, 2007

Related U.S. Application Data

(60) Provisional application No. 60/791,630, filed on Apr. 12, 2006.

(51) Int. Cl.
*G06T 15/50* (2011.01)
*G06T 15/60* (2006.01)
*G06T 17/00* (2006.01)

(52) U.S. Cl.
USPC .......................................... 345/426; 345/420

(58) Field of Classification Search
CPC ........ G06T 15/50; G06T 15/506; G06T 15/06
USPC ................................ 345/426, 420
See application file for complete search history.

(56) References Cited

PUBLICATIONS

Elliott, Steven, Phillip Miller. Et, and Al. Inside 3 D Studio Max 2 vol. I. New Riders, Dec. 1998. Print.*

* cited by examiner

*Primary Examiner* — Ke Xiao
*Assistant Examiner* — Robert Craddock
(74) *Attorney, Agent, or Firm* — Patterson & Sheridan, LLP

(57) ABSTRACT

Component-based rendering and lightning models process scene data to generate rendered images. Components include input and output parameters, data, and/or instructions for evaluation. The component parameters are dynamically typed, so that each component can output data of any arbitrary type and/or quantity to receiving components. The components can also receive data of any type and/or quantity without any advance knowledge of the existence or functionality of the sending component or its output's data type. The components are dynamically bound, so that the dataflow between components is expressed without recompiling components or scene data. Components can be classified into categories, typically representing a discrete functions, operations, or related properties. Components can represent any function or operation associated with rendering, including materials, light sources; colorer components; region definition components; occlusion components; property alteration components; illumination components; reflection and refraction components; broadcasting components; compositing components; post-illumination components; and general utility or modification components.

46 Claims, 6 Drawing Sheets

COMPONENT-BASED LIGHTING

CROSS-REFERENCE TO RELATED APPLICATIONS

This application claims priority to U.S. Provisional Patent Application No. 60/791,630, filed Apr. 12, 2006, and entitled "Component-Based Lighting," which is incorporated by reference herein for all purposes.

BACKGROUND OF THE INVENTION

The present invention relates to the field of computer graphics, and in particular to methods and apparatus for creating, modifying, and using lights and other components to control the attributes and appearance of objects in computer graphics images. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Lighting makes a substantial contribution to the visual appearance of objects in a scene. Some rendering applications attempt to simulate the physics of lights and their illumination effects on objects in a scene as realistically and accurately as possible. Other rendering applications allow lights and their illumination effects to deviate from real-world physics to provide a greater range of artistic expression.

Many rendering applications use shading programs, or shaders, to determine the visual characteristics of objects. The rendering application samples objects at many points to determine the values of pixels of the image. For each sample point on an object, one or more shaders are executed to determine the color, transparency, position, and/or other attributes. Shaders can evaluate numerous input parameters in determining their results. These input parameters include surface attributes of the object, such as the normal vector of the surface of the object at the sample point; material attributes of the object including color and transparency, for example derived from a texture map, and optical properties, such as diffuse and specular reflectivity coefficients; and illumination attributes, such as the color, intensity, direction, and shadowing of the sample point of the object from one or more light sources.

Many rendering applications allow light sources to "broadcast" any number of shader input parameters to one or more target objects in a scene. When shaders of a target object are executed to evaluate sample points, the shaders use these broadcast shader input parameters as well as shader input parameters of the object itself to determine the visual characteristics of the target objects sample points, and thus the visual characteristics of the objects as a whole.

One problem with this approach is that shader programs are typically tied to a surface or object in a scene. Thus, the illuminated value of the object is largely determined by the material shader programs. This limits artistic reflection, as most changes to the illumination must be made by modifying the shader programs of the object. Moreover, lights broadcast values to shaders associated with objects, but material shaders cannot communicate with lights. Thus, illumination computations are limited to effects in which light parameters are received and the material shader program then respond to these parameters. There is no way to perform illumination computations that modify light parameters in response to material shader programs.

Typically, a user using a lighting configuration application would have to access a large list of all possible parameters of the light. The user would then have to configure all of these parameters correctly to broadcast the appropriate shader input parameter values. This process is time-consuming, unwieldy, and error prone. In some implementations, special scripts and applications are required to parse the parameters of lights to generate supporting data and configuration parameters needed to correctly render lights.

Moreover, many parameters of a light may contradict each other if used incorrectly. For example, a previous lighting system could have 40 or more different parameters specifying the area of effect of a light source. These parameters, if used incorrectly, could interact in unpredictable ways. As a result of this complexity, users were required to have detailed knowledge of the lighting system and the functions of all of the light parameters to correctly configure lights.

Additionally, because the light sources are implemented using a monolithic structure, the shader code includes substantial amounts of parameter checking and special case handling routines for parsing all of the light parameters. These routines add substantial overhead, decreasing rendering performance.

Therefore, it is desirable to have a simpler, more efficient, more flexible, and less error-prone system and method for creating, configuring, modifying, customizing, rendering, and using lights in computer graphics images.

BRIEF SUMMARY OF THE INVENTION

An embodiment of the invention uses component-based rendering and lightning models process scene data to generate rendered images. Components include input and output parameters, data, and/or instructions for evaluation. The component parameters are dynamically typed, so that each component can output data of any arbitrary type and/or quantity to receiving components. The components can also receive data of any type and/or quantity without any advance knowledge of the existence or functionality of the sending component or its output's data type.

In a further embodiment, the components are dynamically bound, so that the dataflow between components is expressed without recompiling components or scene data. Components can be classified into categories, typically representing a discrete functions, operations, or related properties.

In an embodiment, components determine the illuminated values of scene geometry. Each component can include parameters specifying its own behavior, parameters to be provided to other components to specify their behavior, data used to determine one or more component outputs, and/or code, programs, or instructions to be executed in the computer graphics system to determine a rendered image.

In an embodiment, the components can be classified into categories. Each category of component typically represents a discrete function, operation, or category of properties associated with rendering. There may be one or more different components within each category representing different potential implementations of the function, operation, or category of properties associated with rendering.

Components can represent any function or operation associated with rendering. Examples of the types of components include: materials, light sources or light emitters; colorer components; region definition or shaper components; occlusion or light blocking components; surface property alteration functions; illumination functions and illumination models, such as BRDFs; reflection and refraction functions; surface parameter broadcasting components, which broadcast shader input parameters or shader functions themselves on to a surface; compositing functions for combining or blending attribute values output from two or more components; post-illumination functions such as color correction; atmosphere attenuation and shading functions; and general utility or modification components, which can modify attribute values from one or more components by any arbitrary function.

BRIEF DESCRIPTION OF THE DRAWINGS

The invention will be described with reference to the drawings, in which.

DETAILED DESCRIPTION OF THE INVENTION

Figure 1:
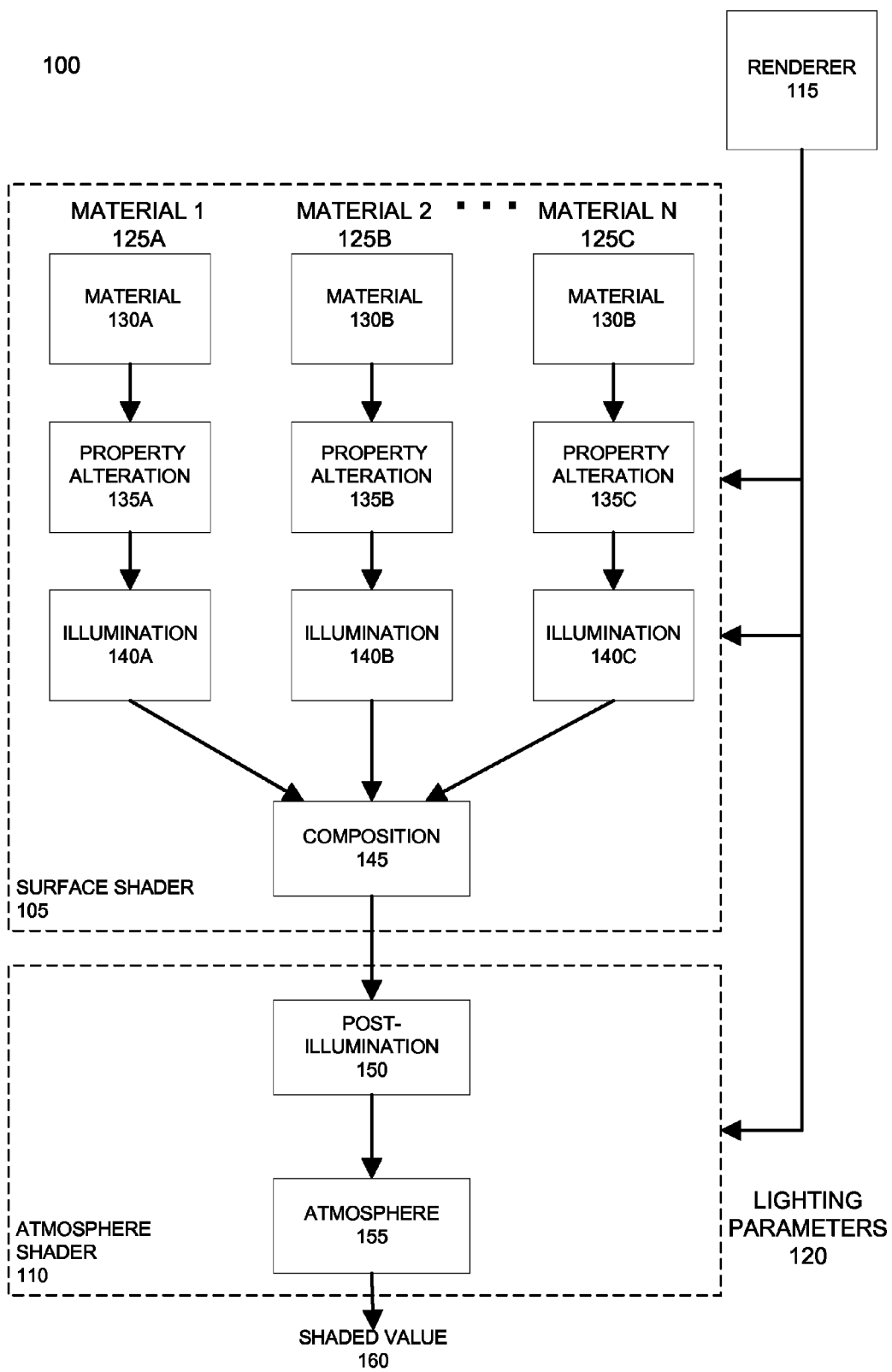
FIG. 1 illustrates a prior architecture for representing lights in computer graphics systems.

FIG. 1 illustrates a prior architecture 100 for representing lights in computer graphics systems. Architecture 100 includes two monolithic shader programs, a surface shader program 105 and an atmosphere shader program 110. A renderer 115 executes shader programs 105 and 110 at least once for each portion of scene geometry, such as a micropolygon or polygon fragment, that potentially contributes to the value of a pixel or sub-pixel sample in a rendered image.

The surface shader program 105 determines the shading from the interaction of one or more lights with the portion of scene geometry. In one implementation, surface shader program 105 handles the shading of one or more lights potentially illuminating a portion of scene geometry, such as a particle, a micropolygon, or a polygon fragment associated with a surface or a volume. The properties, such as the color, opacity, displacement, or normal vector, of each portion of scene geometry can be defined, at least in part, by one or more materials 130, including material 130A, 130B, and 130C. Materials 130 can be defined with one-, two-, three-, or higher-dimensional texture maps; projection paint techniques; procedural patterns; noise functions, such as Perlin or wavelet noise functions; and filtering, blending, interpolation, and compositing functions.

For each of the materials 130, such as materials 130A, 130B, and 130C, the surface shader 105 determines the value of the material at the location of the portion of scene geometry under consideration. The value of the material may then be modified by an associated one of the surface property alteration functions 135, such as surface property alteration functions 135A, 135B, and 135C, respectively. The surface property alteration functions 135 can modify the color, opacity, or other property values of the material.

For each of the materials 130, the surface shader 105 evaluates one of the associated illumination functions 140, such as illumination functions 140A, 140B, and 140C. Illumination functions 140 specify the amount of light reflected and/or scattered from a portion of the scene geometry from one or more lights in the scene. In some implementations, the illuminations functions 140 are bidirectional reflectance distribution functions (BRDF) that model or approximate the reflectance and/or scattering of light based on factors including the incident angle of a light source on the portion of the scene geometry, the reflected angle between the portion of the scene geometry and the camera viewpoint, the intensity of the light source, the occlusion or shadowing of the light source, the color of the light source, and the color and opacity of the portion of the scene geometry under consideration. For some types of materials and light sources, it may be desirable for the illumination function to closely mimic the real-world behavior of light. For other types of materials and/or light sources, the illumination function may only roughly approximate or even contradict the real-world behavior of light.

Each of the illumination functions 140 outputs values representing the color, opacity, and optionally other properties of a portion of scene geometry for each associated material as illuminated by one or more associated light source. A composition function 145 combines the output values of the illumination functions 140 from the materials associated with the portion of the scene geometry. The determination of illuminated properties values for each of the materials associated with a portion of the scene geometry can be performed in parallel, as shown in FIG. 1, or sequentially, with the composition function 145 being executed iteratively to accumulate combined illuminated properties or executed after all of the illuminated property value have been determined.

The combined illuminated property values of the portion of the scene geometry is provided to atmosphere shader program 110. The atmosphere shader program 110 includes an atmosphere shading function 155 to determine shading due to the influence of the atmosphere between the portion of the scene geometry and the camera viewpoint or image plane. The atmosphere shader program 110 also can include post-illumination effect functions 150 to apply effects and perform further color adjustments, for example to change the saturation of colors or adjust the contrast or exposure of the image. The output of the atmosphere shader program 110 is a shaded value 160. In some implementations, the shaded value 160 is returned to the renderer 115 for evaluation. The renderer 115 may use the shaded value 160 to determine all or a portion of the value of a pixel or sub-pixel sample in an image. The renderer 115 may discard the shaded value 160 if it later determines that the portion of the scene geometry associated with the shaded value 160 is hidden or occluded by other portions of the scene.

The surface shader program 105 and atmosphere shader program 110 receive lighting parameters 120 from the renderer 115. In some implementations, lighting parameters 120 are communicated using a program message passing mechanism used to exchange data between software components or applications. In prior computer graphics systems such as architecture 100, a complete set of lighting parameters 120 is sent from the renderer 115 to the surface and atmosphere shading programs 105 and 110. This is required because the shading programs 105 and 110 are monolithic routines that are capable of handling all possible lighting and shading configurations available in the computer graphics system, including special case interactions between different parameters. Because these shading programs 105 and 110 handle all possible lighting and shading configurations, they require a completely defined set of lighting parameters 120 to specify their behavior, even if some or a majority of lighting parameters are irrelevant to a particular instance of a light source.

Typically, a user using a lighting configuration application would have to access a large list of all possible parameters of the light. The user would then have to configure all of these parameters correctly to broadcast the appropriate shader input parameter values. This process is time-consuming, unwieldy, and error prone. Furthermore, because many parameters of a light may contradict each other if used incorrectly, users are required to have detailed knowledge of the lighting system and the functions of all of the light parameters to correctly configure lights.

Additionally, because the surface and atmosphere shader programs are implemented using a monolithic structure that receive all of the lighting parameters 120, the shader code includes substantial amounts of parameter checking and special case handling routines for parsing all of the light parameters. These routines add substantial overhead, decreasing rendering performance.

An embodiment of the invention defines a rendering model comprised of dynamically typed and dynamically bound components to define and implement the operations to create rendered images from a scene description. The components define different operations to be performed on scene description data. Because the components are dynamically typed and bound, each component can output data of any arbitrary type and/or quantity to one or more receiving components. The receiving components can receive data of any type or quantity without any advance knowledge of the existence or functionality of the sending component or its output data type. Furthermore, users can specify the dataflow or interconnections between components without recompiling components.

To improve performance, ease of use, and artistic flexibility, one application of an embodiment of the invention uses a separate lighting model as a framework or architecture for determining the illumination of surfaces and other portions of scene geometry. In an embodiment, light sources and other components are assigned or related to one or more surfaces, objects, or other portions of scene geometry. Surfaces, objects and other portions of scene geometry without a relationship with a light source will not be illuminated or affected by the light source. This allows for artistic flexibility by allowing selected portions of the scene to be illuminated by a given light source without affecting other portions of the scene.

A lighting model specifies the architecture, which may include rules, procedures, programs, and data, that converts the description of materials and illumination properties into one or more values, such as a color value and/or transparency value, for a portion of scene geometry potentially in a rendered image. The lighting model determines the illuminated value of the surface, object, or other portion of the scene geometry specified by the lighting relationship in response to light sources and to the light response of the surface, object, or other portion of the scene geometry. In an embodiment, a lighting model is a portion of the rendering model.

Unlike a surface or material shader program, an embodiment of the lighting model exists separately from both lights and scene geometry. This allows the illumination to be changed and controlled without modifying either the light source itself or the material shader program. The use of lighting models also allows illumination to be determined by attributes of the portion of the scene geometry considered in parallel with attributes from light sources.

Further embodiments of the invention overcome the shortcomings of prior lighting architectures by splitting the monolithic lighting and shading code into separate "chunks" or components. Each component can include parameters specifying its own behavior, parameters to be provided to other components to specify their behavior, data used to determine one or more component outputs, and/or code, programs, or instructions to be executed by the rendering or lighting model in the computer graphics system to evaluate the component.

In an embodiment, the components can be classified into categories. Each category of component represents a discrete function, operation, or category of properties associated with rendering or lighting. There may be one or more different components within each category representing different potential implementations of the function, operation, or category of properties associated with lighting or rendering.

For example, light components of a light source category can represent different types of light sources available for use in the computer graphics system. Example light source components can include a point light source component, directional light source component, and sunlight light source component.

For usability, light components typically perform one or more functions related to a single aspect of a light. One example category of light component is a shadower component. A shadower light component defines how the light is blocked from one or more objects in a scene. A specific example of a shadower component may define attributes and functions for a shadow map to be used with the light. The user can add this shadower component to one or more lights to give the desired shadow effect. Other types of shadower components in this category could implement alternative shadowing techniques, such as ray-traced shadows or shadow volumes. The user can select the appropriate type of shadower component depending upon the desired effect.

It should be noted that a specific instance of a component, such as a shadower, can be used by multiple lights. For example, multiple lights may be used to illuminate an object so that the object has aesthetically pleasing shading and highlights. A single shadower component can be associated with two or more light source component so that, for aesthetic purposes, the object only casts a single shadow. In this example, a user can change the shadow-casting properties of multiple light sources by modifying the parameters of the single shadower component.

Another example category of light component is a region definition or shaper component. A region definition component defines the size and shape of the area of effect of the light. Different types of region definition components can be created for different types of light sources, such as point lights, spot lights, and area lights.

Still another example category of a light component is a colorer component. A colorer component defines the color of the light. Colorer components can set a constant color of a light or a changing light color based upon the distance, angle, or any other attribute of the light or the surface of the object affected by the light. For example, a user can add a colorer component to a light so that the color of the light changes across the surface of an object, thereby providing more visual richness. In another example, a colorer component can be used to change the saturation of the color of the surface, rather than directly specifying the color of the surface.

Each light component only needs the light parameters necessary for its specific function. For example, a point light shaper component might include parameters to specify a radius of effect and a light attenuation curve. However, a spot light shaper component might also include parameters to specify a beam direction and a beam radius. Because of this, light components typically require far fewer parameters to configure, which increases ease of use and decreases the possibility of errors, and do not require substantial amounts of code to parse and process long lists of parameters and numerous special cases, which improves execution performance.

Moreover, users can add, configure, and change light components without affecting the other aspects of lights. For example, a user can add the appropriate shaper component to a light and configure its respective parameters to define the area of effect of the light without modifying any other aspects of the light, such as its shadowing or color.

Light components can represent any function or operation associated with lighting, such as those in architecture 100 discussed above. Examples of the types of components include: materials; light sources or light emitters; colorer components; region definition or shaper components; occlusion or light blocking components; surface property alteration functions; illumination functions and illumination models, such as BRDFs; reflection and refraction functions, using ray-tracing, environment mapping, or any other technique for simulating or approximating reflections and refractions; surface parameter broadcasting components, which broadcast shader input parameters on to a surface; compositing functions for combining or blending attribute values output from two or more components, such as two or more materials associated with a portion of the scene geometry; post-illumination functions such as color correction; atmosphere attenuation and shading functions, which can implement fog and murk effects; and general utility or modification components, which can modify attribute values from one or more components by any arbitrary function. In further embodiments, a rendering model can include light components and additional components, such as material components, which specify the attributes of surfaces or other scene geometry that interact with light, such as color, transparency, surface normals, and displacements.

Components can broadcast any type and any number of shader input parameters or output any number or type of attribute values. For example, a light component can broadcast a light color, a light intensity, a light position, and/or a light occlusion or shadow data. The shader input parameters broadcast by one or more light components associated with a surface or other portion of scene geometry are used by the material component or shader programs, in conjunction with materials and other attributes, to determine the color, transparency, and/or other properties of that portion of the scene geometry.

Because components can be used to broadcast any arbitrary type and number of input parameters or attribute values, components can be used for applications other than traditional lighting and illumination. For example, a component could broadcast a displacement to surfaces of an object. Object surfaces affected by this example component could be displaced according to a displacement value or displacement map specified by the component. Another example component could be used to specify the location on another object or environment map. Object surfaces affected by this example component could use this location information for reflection, refraction, and other visual effects. Another example component can be used to change the visibility of objects in the area of the component's influence. For example, this type of component can be used to make objects within its area of influence invisible. This can be used to hide objects from the camera, for example to fix visibility and collision problems, or to camera placements within a scene that would normally be blocked by other objects.

Embodiments of the components can communicate data with each other, such as shader input parameters and input and output attribute values of the portion of the scene geometry, using any type of data transfer or message passing scheme known in the art. In one embodiment, data from each component is gathered into sets of fields by a computer graphics system as it processes the scene graph or other representation of the scene and its components. Each of the sets of fields are then passed together as a group from one component to another during execution.

Figure 2:
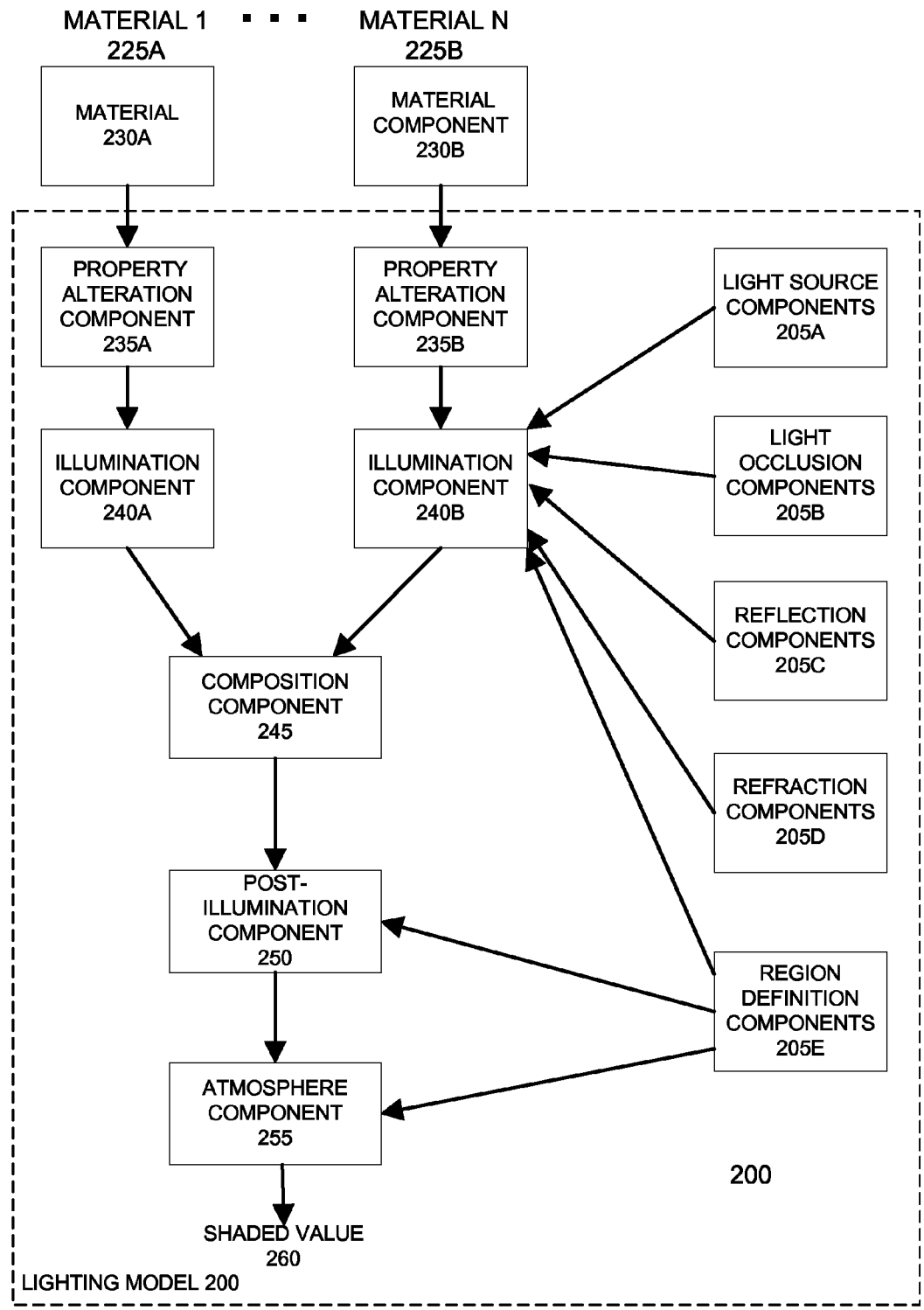
FIG. 2 illustrates an architecture for representing lights in a computer graphics system according to an embodiment of the invention.

FIG. 2 illustrates an architecture 200 for representing lights in a computer graphics system according to an embodiment of the invention.

If the component based architecture 200 implements a lighting model, then materials 230 can be implemented as a monolithic shader program, which implements all of the material shading of one or more materials associated with a surface or other portion of scene geometry in a single shader program, or comprised of multiple shader programs operating together. If the component based architecture 200 is a rendering model, then the material components 230 may be implemented as components similar to the light components.

In architecture 200, a renderer evaluates material components 230A and 230B, for one, two, or any other arbitrary number of materials associated with a portion of scene geometry, such as a particle, a micropolygon, or a polygon fragment, that potentially contributes to the value of a pixel or sub-pixel sample in a rendered image. Material components 230 can be defined using a variety of types of data, including one-, two-, three-, or higher-dimensional texture maps; projection paint techniques; procedural patterns; noise functions, such as Perlin or wavelet noise functions; filtering, blending, interpolation, and compositing functions; and combinations thereof.

For each of the material components 230, an architecture 200 determines the shading and other attributes from the interaction of one or more light components with the portion of scene geometry. Each of the material components 230, such as material components 230A and 230B, specify the values of one or more properties of a portion of scene geometry under consideration. The property values of the portion can include color, opacity, surface normal vectors, or other property values of the material.

In an embodiment, the property values output from each of the material components 230 may be modified by an associated one of the surface property alteration functions 235, such as surface property alteration function components 235A and 235B, respectively. The surface property alteration function components 235 can modify the color, opacity, or other property values of the material.

For each of the material components 230, the architecture 200 evaluates one of the associated illumination function components 240, such as illumination function components 240A and 240B. Illumination function components 240 specify the amount of light reflected and/or scattered from a portion of the scene geometry from one or more lights in the scene.

In some implementations, the illuminations function components 240 implement bidirectional reflectance distribution functions (BRDF) that model or approximate the reflectance and/or scattering of light based on factors including the incident angle of a light source on the portion of the scene geometry, the reflected light angle between the portion of the scene geometry and the camera viewpoint, the direct or indirect intensity of the light source, the occlusion or shadowing of the light source, the color of the light source, and the color and opacity of the portion of the scene geometry under consideration.

The material components 230 and/or associated light sources can utilize the same type of illumination function components 240 or different types of illumination function components 240. For some types of materials and light sources, it may be desirable for the illumination function to closely mimic the real-world behavior of light. For other types of materials and/or light sources, it may be desirable for the illumination function to only roughly approximate or even contradict the real-world behavior of light.

Each of the illumination function components 240 outputs values representing the color, opacity, and optionally other properties of a portion of scene geometry for each associated material as illuminated by one or more associated light source. The outputs of each of the illumination function components 240 are typically determined at least in part from input values from material or surface property alteration components.

Additionally, the outputs of each of the illumination function components 240 are typically determined at least in part from additional shader input parameters provided by other light components 205 representing one or more light sources. Examples of light components that provide shader input parameters to illumination function components include light source components 205A, light occlusion components 205B, light reflection components 205C, light refraction components 205D, and region definition components 205E. A light source in a scene can be defined by the combination of two or more light components. For example, a spotlight that casts a shadow can be defined by a light source component that specifies the color and intensity of the light, a region definition component that defines the shape or area of effect of the light source, and a light occlusion component that specifies the shadowing of the light source, for example using a shadow map or ray tracing data, which may be stored in a brick map or three dimensional texture.

A composition function component 245 combines the output values of the illumination function components 240 from the materials associated with the portion of the scene geometry. The determination of illuminated properties values for each of the materials associated with a portion of the scene geometry can be performed in parallel, as shown in FIG. 2, or sequentially, for example with the composition function component 245 being executed iteratively to accumulate combined illuminated properties after the execution of each of the illumination function components 240 or executed after all of the illuminated property values have been determined.

The combined illuminated property values of the portion of the scene geometry may be provided to a post-illumination effects component 250 to apply effects and perform further color adjustments, for example to change the saturation of colors or adjust the contrast or exposure of the image. The output of the post-illumination effects component 250 may then be provided to an atmosphere shading component 255 to determine shading due to the influence of the atmosphere between the portion of the scene geometry and the camera viewpoint or image plane. Both the post-illumination effects component 250 and atmosphere shading component 255 can be controlled in part by shader input parameters, such as those provided from region definition components 205E that specify the area of effect of these components or other types of light components.

The output of architecture 200 is a shaded value 260. In some implementations, the shaded value 260 is returned to the renderer for evaluation. The renderer may use the shaded value 260 to determine all or a portion of the value of a pixel or sub-pixel sample in an image. The renderer may discard the shaded value 260 if it later determines that the portion of the scene geometry associated with the shaded value 260 is hidden or occluded by other portions of the scene.

Architecture 200 is one example arrangement of components evaluated by a renderer to determine the lighting and shading in a scene. Further embodiments of architecture 200 can include additional components, such as components for additional effects applied to a portion of the scene geometry, or omit some of the components, such as post-illumination or atmosphere shading components.

Figure 3A:
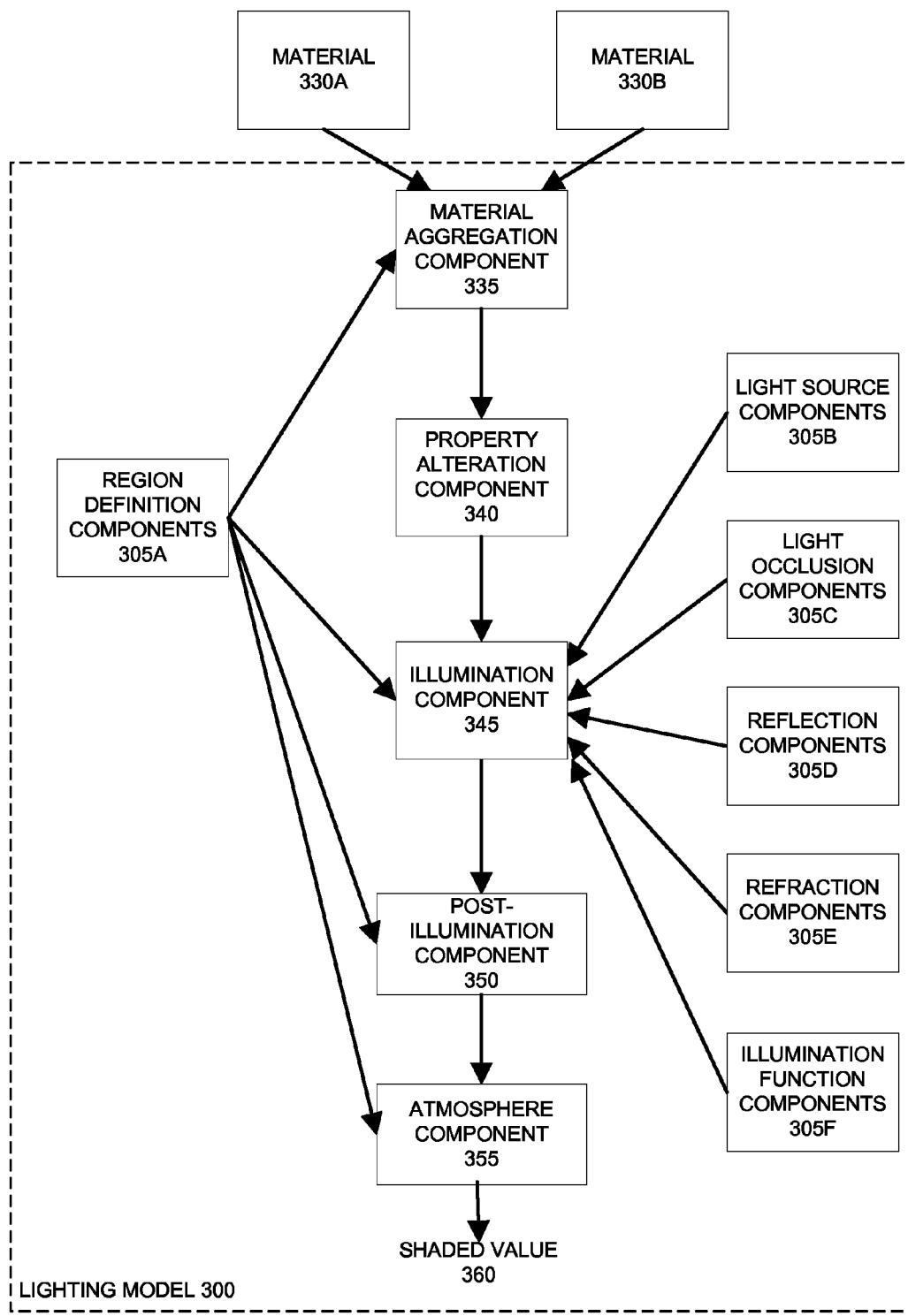
FIGS. 3A-3B illustrates an architecture for representing lights in a computer graphics system according to an embodiment of the invention.

FIG. 3A illustrates another architecture 300 for representing lights in a computer graphics system according to an embodiment of the invention. Architecture 300 uses components similar to those in architecture 200 discussed above.

In architecture 300, a renderer evaluates material components 330, such as material components 330A and 330B, for one, two, or any other arbitrary number of materials associated with a portion of scene geometry, such as a particle, a micropolygon, or a polygon fragment, that potentially contributes to the value of a pixel or sub-pixel sample in a rendered image. Each of the material components 330, such as material components 330A and 330B, specify the values of one or more properties of a portion of scene geometry under consideration. The property values of the portion can include color, opacity, surface normal vectors, or other property values of the material. The property values of material components 330 can be defined using a variety of types of data, including one-, two-, three-, or higher-dimensional texture maps; projection paint techniques; procedural patterns; noise functions, such as Perlin or wavelet noise functions; filtering, blending, interpolation, and compositing functions; and combinations thereof.

Unlike architecture 200, an embodiment of architecture 300 includes a material aggregation component 335. The material aggregation component 335 aggregates property values output from each of the materials 330 associated with the portion of the scene geometry under consideration by the renderer. The material aggregation component 335 allows a single illumination component to evaluate all of the materials and associated lighting and shading parameters.

Following the material aggregation component 335, the aggregated property values may optionally be modified by surface property alteration component 340. In an embodiment, the surface property alteration component 340 can individually modify the color, opacity, or other property values of any or all of the materials. Surface property alteration component 340 can modify properties of two or more materials in parallel or sequentially.

The aggregated surface property values are passed to an illumination component 345. Illumination component 345 determines the effect of illumination of one or more light sources on each of the materials. In an embodiment, the illumination component 345 evaluates the light source components 305B, and other components influencing illumination, such as region definition components 305A, light occlusion components 305C, reflection components 305D, and refraction components 305E, associated with each of the materials included in the aggregated surface property values. In a further embodiment, illumination component 345 applies illumination models specified by one or more illumination function components 305F. The illumination function components 305F can specify BRDFs or other types of illumination models. The illumination component 345 can apply different illumination functions, as specified by different illumination function components 305F, for each light source and/or material.

The results of these illumination evaluations are combined for each light source associated with one of the materials, and then further combined for each material to produce a single set of illuminated property values, such as color and opacity, for the portion of the surface geometry. The determination of illuminated properties values for each of the materials associated with a portion of the scene geometry can be performed in parallel or sequentially.

The combined illuminated property values of the portion of the scene geometry may be provided by the illumination component 345 to a post-illumination effects component 350 to apply effects and perform further color adjustments, for example to change the saturation of colors or adjust the contrast or exposure of the image. The output of the post-illumination effects component 350 may then be provided to an atmosphere shading component 355 to determine shading due to the influence of the atmosphere between the portion of the scene geometry and the camera viewpoint or image plane. Both the post-illumination effects component 350 and atmosphere shading component 355 can be controlled in part by shader input parameters, such as those provided from region definition components 305A that specify the area of effect of these components or other types of components.

The output of architecture 300 is a shaded value 360. In some implementations, the shaded value 360 is returned to the renderer for evaluation. The renderer may use the shaded value 360 to determine all or a portion of the value of a pixel or sub-pixel sample in an image. The renderer may discard the shaded value 360 if it later determines that the portion of the scene geometry associated with the shaded value 360 is hidden or occluded by other portions of the scene.

Figure 3B:
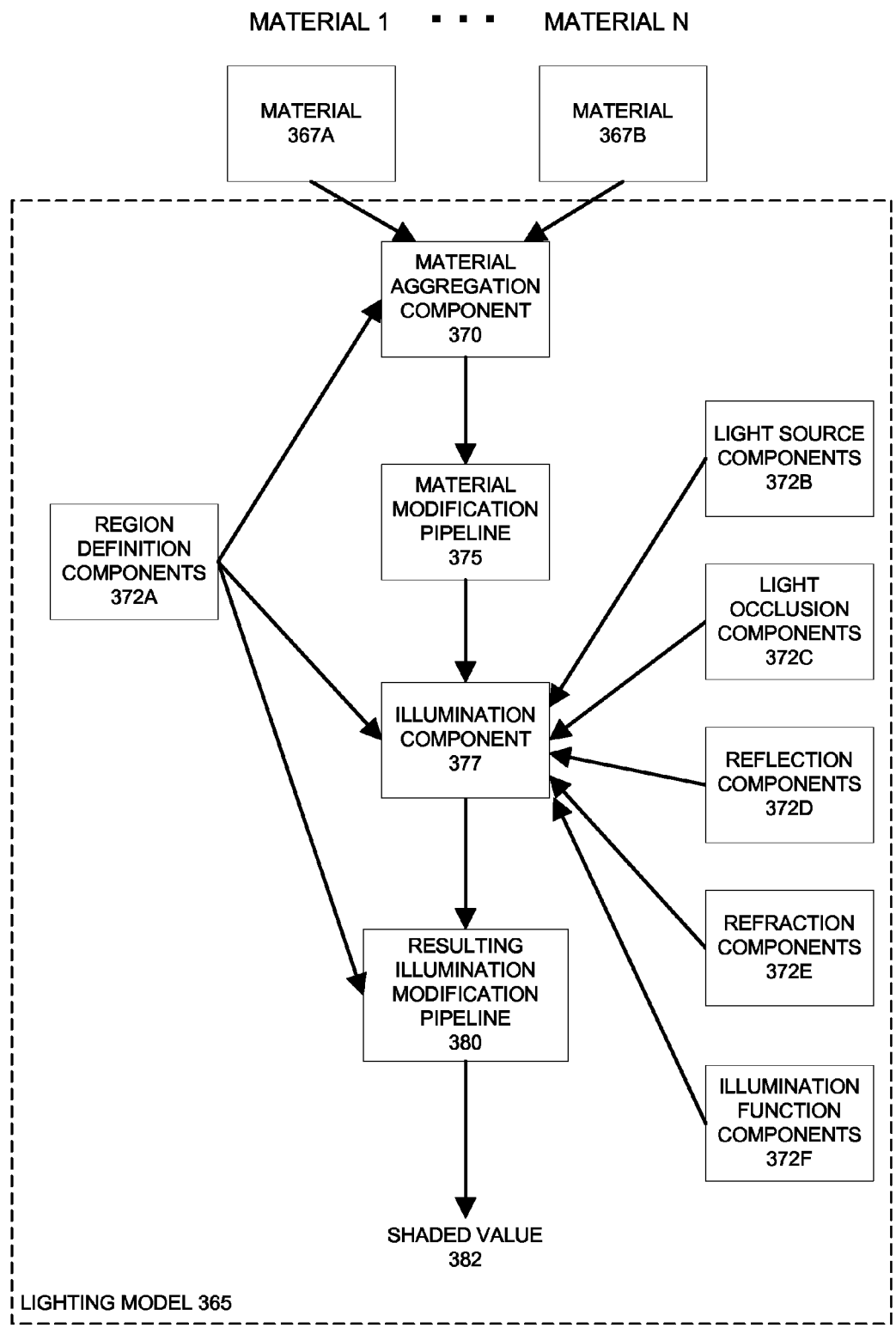

FIG. 3B illustrates a generalized architecture 365 according to an embodiment of the invention. In architecture 365, a renderer executes materials 367, such as materials 367A and 367B, for one, two, or any other arbitrary number of materials associated with a portion of scene geometry, such as a particle, a micropolygon, or a polygon fragment, that potentially contributes to the value of a pixel or sub-pixel sample in a rendered image.

The material aggregation component 370 aggregates property values output from each of the materials 367 associated with the portion of the scene geometry under consideration by the renderer. The material aggregation component 3367 allows a single illumination component to evaluate all of the materials and associated lighting and shading parameters.

Following the material aggregation component 370, the aggregated property values may optionally be modified by a material modification pipeline 375. The material aggregation pipeline 375 can individually modify the color, opacity, or other property values of any or all of the aggregated materials using one or more components executed in sequence and/or in parallel.

The aggregated and modified property values are passed to an illumination component 377. Illumination component 377 determines the effect of illumination of one or more light sources on each of the materials. In an embodiment, the illumination component 377 evaluates the light source components 372B, and other components influencing illumination, such as region definition components 372A, light occlusion components 372C, reflection components 372D, and refraction components 372E, associated with each of the materials included in the aggregated surface property values. In a further embodiment, illumination component 377 applies illumination models specified by one or more illumination function components 372F. The illumination function components 372F can specify BRDFs or other types of illumination models. The illumination component 377 can apply different illumination functions, as specified by different illumination function components 377F, for each light source and/or material.

The results of these illumination evaluations are combined for each light source associated with one of the materials, and then further combined for each material to produce a single set of illuminated property values, such as color and opacity, for the portion of the surface geometry. The determination of illuminated properties values for each of the materials associated with a portion of the scene geometry can be performed in parallel or sequentially.

The combined illuminated property values output by illumination component 377 may optionally be modified by an illumination modification pipeline 380. The illumination modification pipeline 375 can individually modify the color, opacity, or other property values of any or all of the illuminated attribute values of the portion of the scene geometry using one or more light components executed in series and/or in parallel. Illumination modification pipeline 375 can include light components for atmospheric effects as well as for performing further color adjustments, for example to change the saturation of colors or adjust the contrast or exposure of the image.

The output of architecture 365 is a shaded value 382. In some implementations, the shaded value 382 is returned to the renderer for evaluation. The renderer may use the shaded value 382 to determine all or a portion of the value of a pixel or sub-pixel sample in an image. The renderer may discard the shaded value 382 if it later determines that the portion of the scene geometry associated with the shaded value 382 is hidden or occluded by other portions of the scene.

Architectures 200, 300, and 365 are example arrangement of components evaluated by a renderer to determine the lighting and shading in a scene. Further embodiments of architecture 300 can include additional components, such as light components for additional effects applied to a portion of the scene geometry, or omit some of the components, such as post-illumination or atmosphere shading components.

In architectures 200, 300, and 365, as well as block diagram 400 discussed below, the arrows between components indicate dataflow connections between components. These dataflow connections can communicate any arbitrary type and/or quantity of data values between components. Additionally, dataflow connections can communicate data type metadata associated with data values to assist receiving components in processing data. In further embodiments, components can pass on data type metadata received from one or more components to one or more subsequent components for evaluation and/or processing. Furthermore, communication between components can be bidirectional in some embodiments.

In embodiments of the invention, a receiving component can process data of any arbitrary quantity and type provided that the received data has a data type derived at least in part from a base or parent data type that the receiving component has been adapted to handle. Some components may provide data of a data type derived from multiple parent or base data types. In further embodiments, the receiving component can process received data in part by invoking or executing program code or data object methods associated with the sending component.

Examples of base data types include scalar, n-tuples, matrices, strings, and Boolean values. Examples of parent data types include any arbitrary data type or object constructed from one or more of the base data types. For example, color can be expressed as triple (a 3-tuple) or a quadruple (a 4-tuple). Examples of more complex data types can include rendering specific data types, such as those representing properties of light sources, occluders, and any other type of component. In this example, different implementations of a component may be associated with different data types. For example, both a shadow mapping component and a ray traced occlusion component can be considered occlusion components. As such, their outputs may each be derived from an occluder parent class or even a scalar base class. However, the shadow mapping component may output data in a shadow mapping data type derived from the occluder parent class, while the ray traced occlusion component may output data in a different ray traced occlusion data type, also derived from the occluder parent class.

Additionally, components can encapsulate additional instances of a rendering or lighting model. For example, a reflection or refraction component may need to evaluate or render the scene from an alternate camera angle or point of view to determine the reflection or refraction of light by a surface of an object. During this evaluation, a separate instance of a rendering model may be executed to determine the illuminated values of the reflected or refracted scene. This separate instance of the rendering model and its respective components may be the same or different than the rendering model that initiates the execution of the reflection or refraction component.

In a further embodiment, instances of rendering or lighting models may be called recursively. For example, atmospheric effects can scatter light reflected off of a surface. This scattered light may in turn illuminate other surfaces. Thus, for example, atmospheric effects components in a lighting model can generate additional light sources, representing scattered light, to be processed in subsequent iterations of the lighting model.

Figure 4:
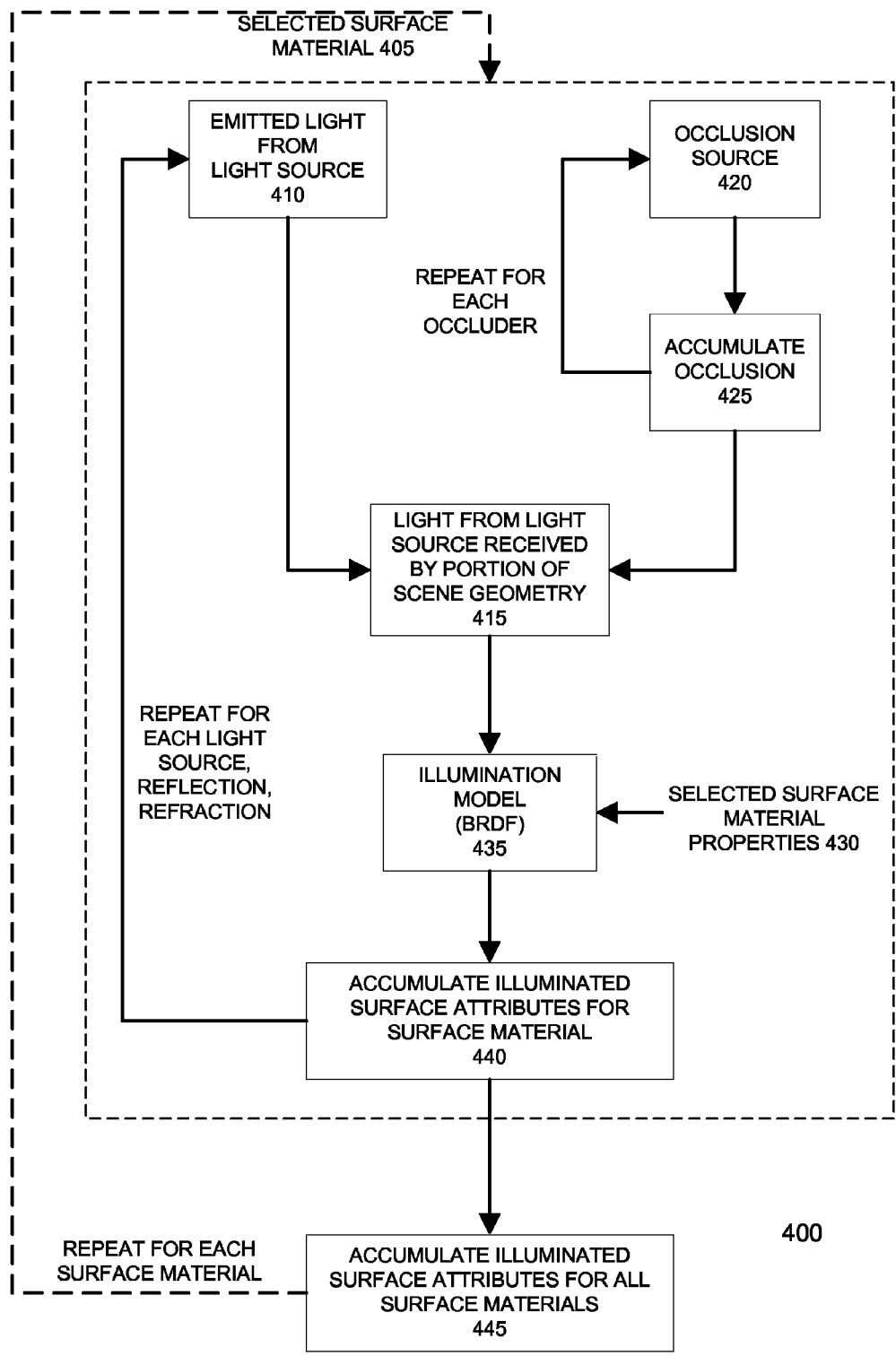
FIG. 4 illustrates the computation of illumination using a lighting model in a computer graphics system according to an embodiment of the invention.

FIG. 4 illustrates the illumination computation 400 in a lighting model in a computer graphics system according to an embodiment of the invention. The functionality of block diagram 400 can be implemented by an illumination component, such as illumination component 345 in architecture 300 discussed above.

In an embodiment, a set of aggregated property values, such as the color, opacity, position, and surface normals, for one or more materials is received. From this set of aggregated property values, one of the materials is selected for evaluation. For the selected material 405, all of the associated components, such as light source components, region definition components, reflection and refraction components, occlusion components, and illumination model components, are evaluated in block 407 to determine illuminated surface attribute values for the selected material.

In an embodiment, the emitted light from a selected light source is determined by selecting and evaluating an associated light source component in block 410. In a further embodiment, block 410 further evaluates one or more region definition components associated with the selected light source to determine the amount of light emitted from the selected light source.

Each light source can be associated with one or more occlusion sources, which block some or all of the light emitted from the selected light source from reaching the portion of the scene geometry under consideration. Block 420 evaluates a light occlusion component associated with the selected light source to determine the occlusion or amount of light blocked from the light source at the portion of the scene geometry under consideration. Embodiments of block 420 can evaluate shadow maps, ray traced occlusion data, for example stored in a brick map, or any other function implemented by a light occlusion component to determine the occlusion of light from the selected light source at the portion of the scene geometry under consideration. Some types of light occlusion components may require some property values of the portion of the scene geometry, the selected material, and/or the selected light source to determine the amount of light occlusion. This may include the position and/or orientation of the portion of the scene geometry and the light source position.

Block 420 may be repeated to evaluate multiple light occlusion components associated with the selected light source. The total occlusion from one or more light occlusion components associated with the selected light source is accumulated by block 425.

Block 415 scales or otherwise combines the emitted light from the selected light source determined in block 410 with the total occlusion of the light source at the portion of the scene geometry under consideration as determined in block 425. If the emitted light is not completely occluded, then the remaining emitted light is passed to block 435.

Block 435 evaluates the effect of illumination on the portion of the scene geometry under consideration. In an embodiment, block 435 applies the illumination model component associated with the selected material and/or selected light source. Block 435 includes an input from block 415 for the amount of emitted and non-occluded light at the portion of the scene geometry and optionally inputs for property values 430 of the selected material at the portion of the scene geometry under consideration. The illumination model component applied in block 435 can be of a BRDF of any arbitrary complexity, such as a flat shading illumination model, a Phong illumination model, or more complex BRDFs, such as a cosine lobe BRDF.

The output of block 435 is the shaded and illuminated value of the selected material for the selected light source and all of its associated occlusion. Blocks 410 to 435 may be repeated for any additional light sources associated with the selected material. The outputs of block 435 for each of the light sources associated with the selected material are combined or accumulated by block 440. In a further embodiment, reflection and refraction components are evaluated in a similar manner as light sources by blocks 410 to 435. For example, a reflection component implementing an environment map or accessing ray traced reflection or refraction data can be seen as a light source broadcasting or projecting a reflected or refracted image of the scene on to the portion of the scene geometry.

Once all of the light sources associated with the selected material have been evaluated, the combined shaded and illuminated value is output from block 440 to block 445. Block 445 combines or accumulates shaded and illuminated values from one or more materials associated with the portion of the scene geometry under consideration. If there are other materials associated with the portion of the scene geometry that have not been evaluated, each of the remaining materials are selected in turn and blocks 410 to 440 are repeated for each selected material and its associated light sources. The resulting shaded and illuminated values are combined or accumulated by block 445.

When all of the materials and associated light sources are evaluated, block 445 outputs the combined shaded and illuminated value for all of the materials associated with a portion of the scene geometry. This shaded and illuminated value can be used alone or further processed by lighting and shading architectures, such as architecture 300 discussed above.

In an embodiment, a component includes a specification of the parameters of the component and a specification of one or more component functions that convert component parameter values into one or more shader input parameters. In a further embodiment, the component can include a user interface specification for the component. The user interface specification enables a lighting or other computer graphics application to present the user with a graphical user interface for configuring the values of the component parameter. In another embodiment, the functions of the component can be specified using any type or combination of scripting languages, programming language, or shading language, such as Cg or the Renderman shading language. In still another embodiment, the component can include two or more alternate versions of a component function adapted for use in different contexts, such as during a real-time preview rendering or during a final production rendering.

In a further embodiment, components can be created and modified using an object-orientated framework. An existing component can be used as a parent class of a new component. The new component can add parameters and functions to augment or override parameters and functions of the parent class. For example, the illumination component 400 can be implemented as a base or parent class object. This object can invoke or execute methods of additional objects representing light components.

Embodiments of the object-orientated component framework can be implemented using object-orientated programming languages and techniques. For example, a first dynamically typed and bound component can be adapted to receive data in a base data type format. A second component can be adapted to provide data in a second data type format. As long as the second data type format is derived at least in part from the base data type format, the first component can perform the correct type of operation on the received data. For example, the second data type can be derived entirely from the base data type or from two or more data types including the base data type.

In further embodiments, components provide type metadata along with its data so that receiving components can identify the data type and process data correctly. This allows the data type to be determined dynamically as data is received. Additionally, components that process received data may further provide the processed data along with its type metadata to additional components. This allows further components to perform additional processing on the data regardless of its data type.

Other embodiments of the object-orientated framework can be implemented in non-object-orientated programming languages using programming conventions and programming macros. For example, inheritance from a parent component can be implemented by copying the code from the parent component into the beginning of the code of the child component. Similarly, attribute and function overrides can be implemented by adding the overriding child component specifications to the code after the parent component specifications, so that the child component specifications redefine attributes and functions previously defined by the parent component code. An embodiment combines light components dynamically at runtime using dynamic binding and linking mechanisms to specify lights in a scene.

Figure 5:
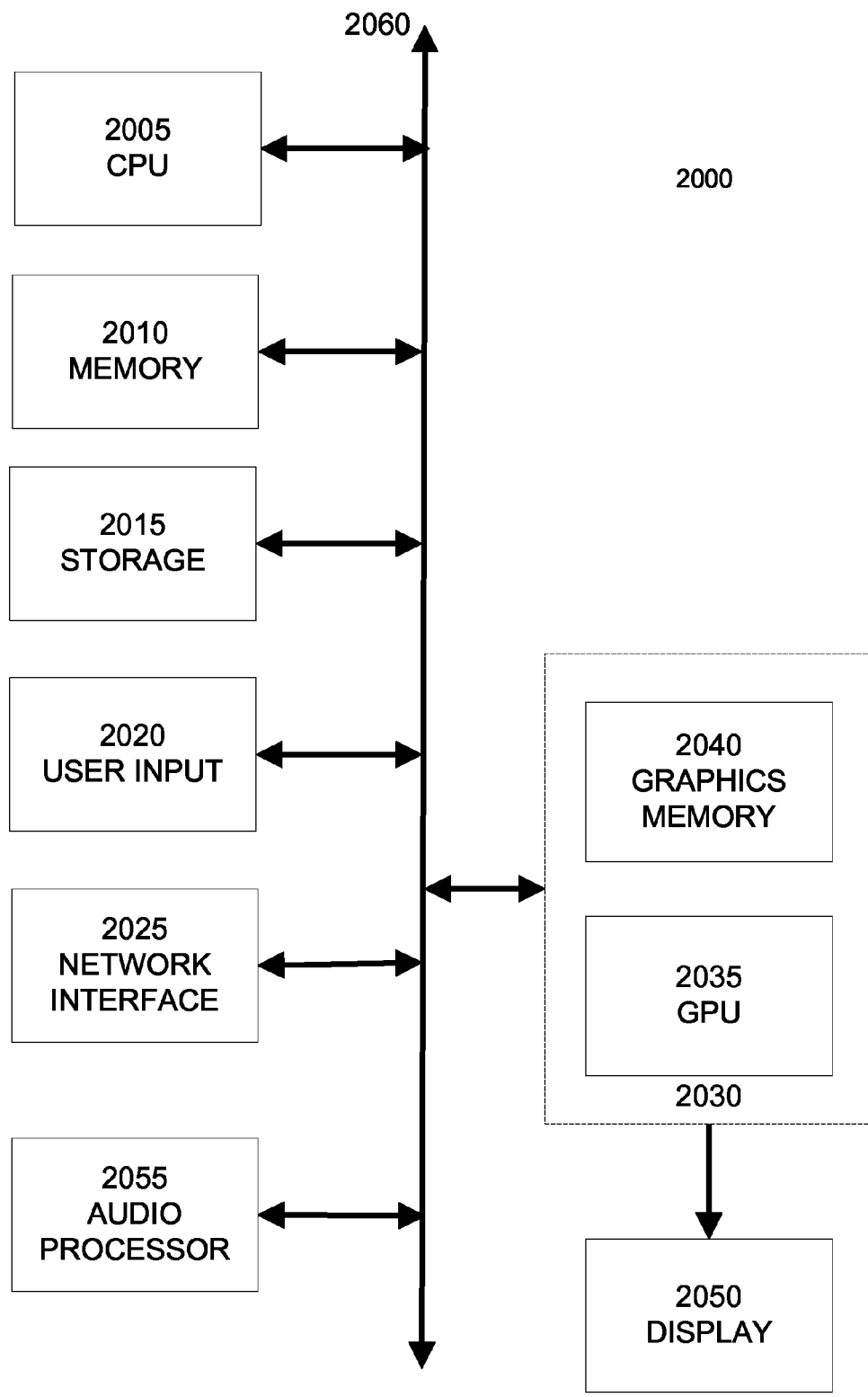
FIG. 5 illustrates a computer system suitable for implementing an embodiment of the invention.
Figure 4:
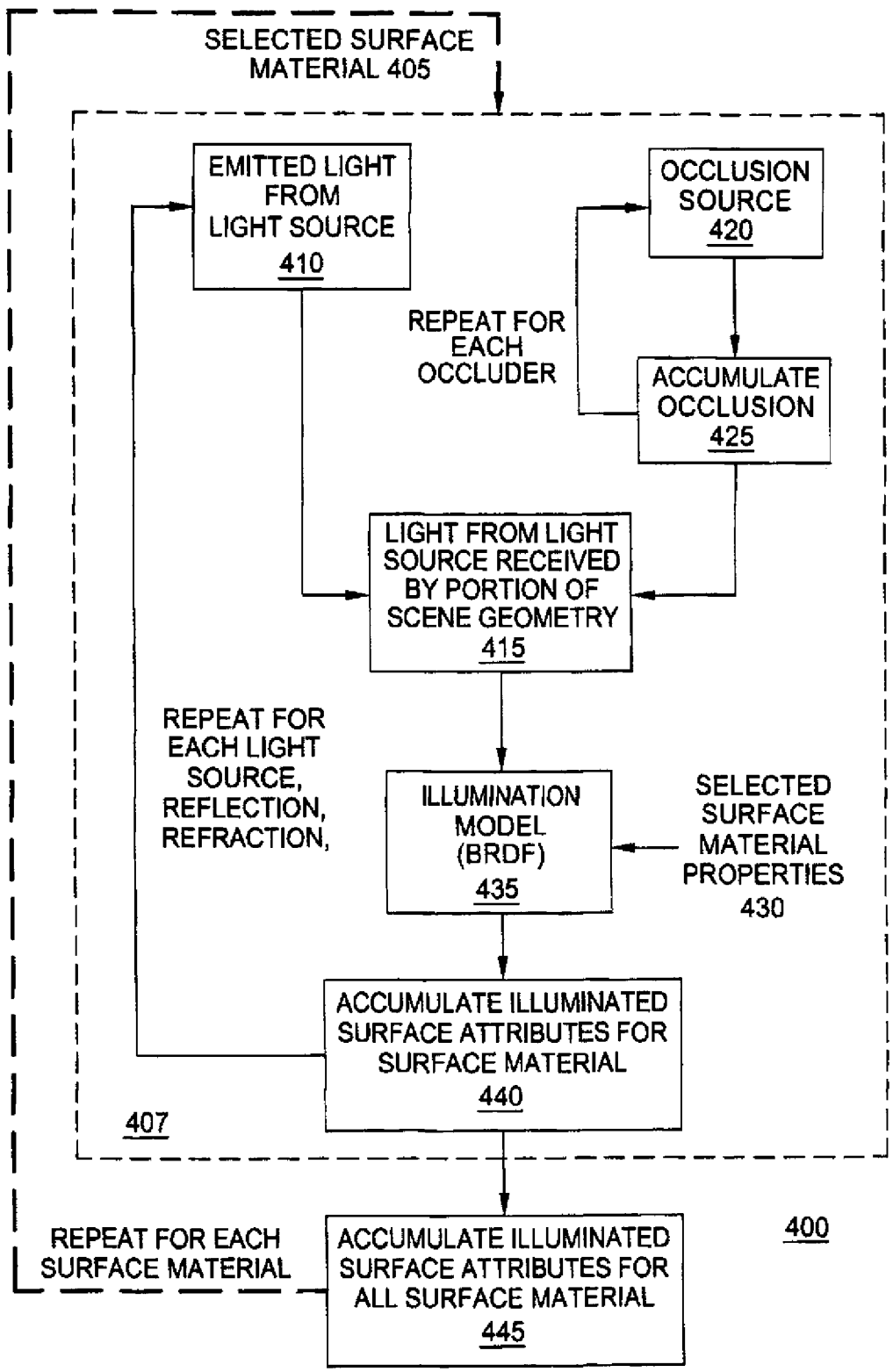

FIG. 5 illustrates a computer system suitable for implementing an embodiment of the invention. FIG. 5 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further aspects of embodiments of the invention are illustrated in the attached figures. Additional embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention.

What is claimed is:

1. A non-transitory computer-readable medium containing a program configured to provide component-based lighting when executed, the program comprising:
   a material component adapted to output a material attribute of scene geometry; and
   an illumination component coupled with the material component and adapted to output a modified material attribute based on at least one illumination attribute, wherein the illumination component is further coupled with a plurality of subcomponents comprising: (i) a first illumination subcomponent providing a first subset of illumination input attributes; and (ii) a second illumination subcomponent providing a second subset of illumination input attributes; of which each illumination subcomponent requires only one or more respective parameters specific to the respective illumination subcomponent, to the exclusion of at least one respective parameter not specific to the respective illumination subcomponent, thereby reducing a count of parameters with which each illumination subcomponent is required to be configured, thereby reducing an amount of parameter checking performed for each illumination subcomponent, thereby reducing processing incurred from one or more special case handling routines for parameter parsing for each illumination subcomponent, wherein the illumination component is adapted to determine the illumination attribute based on at least the first and second subsets of illumination input attributes.

2. The non-transitory computer-readable medium of claim 1, wherein the material component is coupled with the illumination component through at least a property alteration component, wherein the first and second subsets of illumination input attributes comprise distinct sets of illumination input attributes.

3. The non-transitory computer-readable medium of claim 1, wherein the material component is coupled with the illumination component through a material aggregation component adapted to combine the material attribute with a second material attribute and provide the combined material attribute to the illumination component.

4. The non-transitory computer-readable medium of claim 1, wherein the first illumination subcomponent also provides the first subset of illumination input attributes to an additional component, wherein the additional component is coupled with the output of the illumination component and adapted to output a second modified attribute based on at least the first subset of the illumination component.

5. The non-transitory computer-readable medium of claim 4, wherein the first illumination subcomponent includes a region definition component.

6. The non-transitory computer-readable medium of claim 1, wherein the first subset of illumination input attributes includes a first input attribute having a first data type derived at least in part from a first parent data type.

7. The non-transitory computer-readable medium of claim 6, wherein the illumination component is adapted to invoke execution of code associated with the first illumination subcomponent to process the first input attribute.

8. The non-transitory computer-readable medium of claim 7, wherein the code associated with the first illumination subcomponent belongs to an object method of the first illumination subcomponent.

9. The non-transitory computer-readable medium of claim 6, wherein the first illumination subcomponent specifies data type metadata in conjunction with the first input attribute, wherein the data type metadata is adapted to identify the first data type of the first input attribute.

10. The non-transitory computer-readable medium of claim 6, wherein the illumination component is adapted to receive the data type metadata associated with the first input attribute.

11. The non-transitory computer-readable medium of claim 6, wherein the illumination component is adapted to receive illumination input attributes having data types including the parent data type.

12. The non-transitory computer-readable medium of claim 1, wherein the first illumination subcomponent includes a light source component specifying a light color and/or intensity attribute.

13. The non-transitory computer-readable medium of claim 1, wherein the first illumination subcomponent includes a light occlusion component specifying an occlusion attribute of a light source.

14. The non-transitory computer-readable medium of claim 1, wherein the first illumination subcomponent includes a reflection component specifying a reflection attribute of a light source.

15. The non-transitory computer-readable medium of claim 1, wherein the first illumination subcomponent includes a refraction component specifying a refraction attribute of a light source.

16. The non-transitory computer-readable medium of claim 1, wherein the first illumination subcomponent includes an illumination function component specifying a function for determining an illumination attribute.

17. The non-transitory computer-readable medium of claim 1, wherein the first illumination subcomponent includes a region definition component specifying a shape and/or area of effect attribute of a light source.

18. A system to provide component-based lighting, the system comprising:
   one or more computer processors;
   a memory containing a program which, when executed by the one or more computer processors, performs an operation to provide component-based lighting, the program comprising:
      a material component adapted to output a material attribute of scene geometry; and
      an illumination component coupled with the material component and adapted to output a modified material attribute based on at least one illumination attribute, wherein the illumination component is further coupled with a plurality of subcomponents comprising: (i) a first illumination subcomponent providing a first subset of illumination input attributes; and (ii) a second illumination subcomponent providing a second subset of illumination input attributes; of which each illumination subcomponent requires only one or more respective parameters specific to the respective illumination subcomponent, to the exclusion of at least one respective parameter not specific to the respective illumination subcomponent, thereby reducing a count of parameters with which each illumination subcomponent is required to be configured, thereby reducing an amount of parameter checking performed for each illumination subcomponent, thereby reducing processing incurred from one or more special case handling routines for parameter parsing for each illumination subcomponent, wherein the illumination component is adapted to determine the illumination attribute based on at least the first and second subsets of illumination input attributes.

19. The system of claim 18, wherein the material component is coupled with the illumination component through at least a property alteration component, wherein the first and second subsets of illumination input attributes comprise distinct sets of illumination input attributes.

20. The system of claim 18, wherein the material component is coupled with the illumination component through a material aggregation component adapted to combine the material attribute with a second material attribute and provide the combined material attribute to the illumination component.

21. The system of claim 18, wherein the first illumination subcomponent also provides the first subset of illumination input attributes to an additional component, wherein the additional component is coupled with the output of the illumination component and adapted to output a second modified attribute based on at least the first subset of the illumination component.

22. The system of claim 21, wherein the first illumination subcomponent includes a region definition component.

23. The system of claim 18, wherein the first subset of illumination input attributes includes a first input attribute having a first data type derived at least in part from a first parent data type.

24. The system of claim 23, wherein the illumination component is adapted to invoke execution of code associated with the first illumination subcomponent to process the first input attribute.

25. The system of claim 24, wherein the code associated with the first illumination subcomponent belongs to an object method of the first illumination subcomponent.

26. The system of claim 23, wherein the first illumination subcomponent specifies data type metadata in conjunction with the first input attribute, wherein the data type metadata is adapted to identify the first data type of the first input attribute.

27. A computer-implemented method to provide component-based lighting by a program, the computer-implemented method comprising:
outputting, by a material component of the program, a material attribute of scene geometry;
outputting, by an illumination component the program, a modified material attribute based on at least one illumination attribute, wherein the illumination component is coupled with the material component and is further coupled with a plurality of subcomponents comprising: (i) a first illumination subcomponent providing a first subset of illumination input attributes; and (ii) a second illumination subcomponent providing a second subset of illumination input attributes; of which each illumination subcomponent requires only one or more respective parameters specific to the respective illumination subcomponent, to the exclusion of at least one respective parameter not specific to the respective illumination subcomponent, thereby reducing a count of parameters with which each illumination subcomponent is required to be configured, thereby reducing an amount of parameter checking performed for each illumination subcomponent, thereby reducing processing incurred from one or more special case handling routines for parameter parsing for each illumination subcomponent; and
determining, by the illumination component, the illumination attribute based on at least the first and second subsets of illumination input attributes.

28. The computer-implemented method of claim 27, wherein the material component is coupled with the illumination component through at least a property alteration component, wherein the first and second subsets of illumination input attributes comprise distinct sets of illumination input attributes.

29. The computer-implemented method of claim 27, wherein the material component is coupled with the illumination component through a material aggregation component of the program, wherein the computer-implemented method further comprises:
combining, by the material aggregation component, the material attribute with a second material attribute; and
providing the combined material attribute to the illumination component.

30. The computer-implemented method of claim 27, further comprising:
providing, by the first illumination subcomponent, the first subset of illumination input attributes to an additional component coupled with the output of the illumination component; and
outputting, by the additional component, a second modified attribute based on at least the first subset of the illumination component.

31. The computer-implemented method of claim 30, wherein the first illumination subcomponent includes a region definition component.

32. The computer-implemented method of claim 27, wherein the first subset of illumination input attributes includes a first input attribute having a first data type derived at least in part from a first parent data type.

33. The computer-implemented method of claim 32, further comprising:
Invoking, by the illumination component, execution of code associated with the first illumination subcomponent to process the first input attribute.

34. The computer-implemented method of claim 33, wherein the code associated with the first illumination subcomponent belongs to an object method of the first illumination subcomponent.

35. The computer-implemented method of claim 32, wherein the first illumination subcomponent specifies data type metadata in conjunction with the first input attribute, wherein the data type metadata is adapted to identify the first data type of the first input attribute.

36. The computer-implemented method of claim 27, wherein the illumination component is adapted to receive, from a sending component, data of any type and of any quantity without any advance knowledge of the existing or functionality of the sending component or its output data type, wherein dataflow between components is adapted to be user-configured without requiring recompiling the components, wherein interconnections between components is adapted to be user-configured without requiring recompiling the components.

37. The computer-implemented method of claim 36, wherein the scene geometry includes a plurality of distinct objects, wherein each object is not illuminated or affected by a given light source unless a relationship between the respective object and the given light source is explicitly user-specified, thereby providing facilitating artistic flexibility in allowing selected portions of the scene geometry to be illuminated by the given light source without affecting other portions of the scene geometry, wherein the selected portions of the scene geometry include at least a first object having a relationship with the given light source, wherein the other portions of the scene geometry include at least a second object not having any relationship with the given light source, wherein each illumination subcomponent is adapted to, in respective instances, be configured without affecting other aspects of illumination.

38. The computer-implemented method of claim 37, thereby providing a lighting model that exists separately from both: (i) the scene geometry and (ii) light sources associated with the scene geometry; thereby supporting modification of illumination without requiring the light sources to be modified and without requiring any material shader program to be modified, thereby supporting determination of illumination based on attributes of the selected portion of the scene geometry and based further on attributes of the light sources associated with the scene geometry.

39. The computer-implemented method of claim 38, whereby component-based lighting is provided with a higher degree of flexibility and efficiency, relative to an instance in which the lighting model does not exist separately from both: (i) the scene geometry and (ii) light sources associated with the scene geometry; in which instance modification of illumination requires the light sources or a material shader program to be modified.

40. The computer-implemented method of claim 39, wherein the first and second subsets of illumination input attributes comprise distinct sets of illumination input attributes, wherein the material component is, in a first instance, coupled with the illumination component through at least a property alteration component of the program, wherein the material component is, in a second instance, coupled with the illumination component through the material aggregation component.

41. The computer-implemented method of claim 40, wherein the computer-implemented method in the second instance further comprises:
  combining, by the material aggregation component, the material attribute with a second material attribute;
  providing the combined material attribute to the illumination component;
  providing, by the first illumination subcomponent, the first subset of illumination input attributes to an additional component of the program, wherein the additional component is coupled with the output of the illumination component; and
  outputting, by the additional component, a second modified attribute based on at least the first subset of the illumination component.

42. The computer-implemented method of claim 41, wherein the first illumination subcomponent includes a region definition component of the program, wherein the first subset of illumination input attributes includes a first input attribute having a first data type derived at least in part from a first parent data type, wherein the computer-implemented method further comprises:
  invoking, by the illumination component, execution of code associated with the first illumination subcomponent in order to process the first input attribute, wherein the code associated with the first illumination subcomponent belongs to an object method of the first illumination subcomponent.

43. The computer-implemented method of claim 42, wherein the first illumination subcomponent specifies data type metadata in conjunction with the first input attribute, wherein the data type metadata is adapted to identify the first data type of the first input attribute, wherein the computer-implemented method further comprises:
  receiving, by the illumination component, the data type metadata associated with the first input attribute; and
  receiving, by the illumination component, illumination input attributes having data types including the parent data type.

44. The computer-implemented method of claim 43, wherein the first illumination subcomponent includes, in respective instances:
  (i) a light source component of the program, which specifies a light color attribute and a light intensity attribute;
  (ii) a light occlusion component of the program, which specifies an occlusion attribute of a light source;
  (iii) a reflection component of the program, which specifies a reflection attribute of a light source;
  (iv) a refraction component of the program, which specifies a refraction attribute of a light source;
  (v) an illumination function component of the program, which specifies a function configured to determine an illumination attribute;
  (vi) a region definition component of the program, which specifies a shape attribute of a light source and an area of effect attribute of the light source; and
  (vii) an atmospheric effect component of the program, which is adapted to scatter light reflected off of a specified surface.

45. The computer-implemented method of claim 44, wherein in a given instance, the first illumination subcomponent includes the light source component, the light occlusion component, the reflection component, the refraction component, the illumination function component, and the region definition component.

46. The computer-implemented method of claim 27, wherein the first illumination subcomponent includes a reflection component specifying a reflection attribute of a light source.

* * * * *

UNITED STATES PATENT AND TRADEMARK OFFICE
CERTIFICATE OF CORRECTION

| | |
|---|---|
| PATENT NO. | : 8,773,433 B1 |
| APPLICATION NO. | : 11/734777 |
| DATED | : July 8, 2014 |
| INVENTOR(S) | : Eliot Smyrl |

It is certified that error appears in the above-identified patent and that said Letters Patent is hereby corrected as shown below:

In the Drawings:

Sheet 5 of 6, please insert --407-- in the dotted block (see attached sheet);

In the Specification:

In Detailed Description of the Invention:

Column 11, Line 38, please delete "3367" and insert --370-- therefor;

Column 12, Line 10, please delete "375" and insert --380-- therefor;

Column 12, Line 14, please delete "375" and insert --380-- therefor.

Signed and Sealed this
Eleventh Day of November, 2014

Michelle K. Lee
*Deputy Director of the United States Patent and Trademark Office*